(12) United States Patent
Alqahtani et al.

(10) Patent No.: US 12,354,788 B2
(45) Date of Patent: Jul. 8, 2025

(54) TUNING THE MAGNETIC BEHAVIOR OF SOFT MAGNETIC NANOWIRES

(71) Applicant: KING SAUD UNIVERSITY, Riyadh (SA)

(72) Inventors: Hadi Rasam Alqahtani, Riyadh (SA); Alhanouf Abdullah Alrwais, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/782,577

(22) Filed: Jul. 24, 2024

(65) Prior Publication Data

US 2024/0379286 A1    Nov. 14, 2024

Related U.S. Application Data

(62) Division of application No. 18/134,170, filed on Apr. 13, 2023, now Pat. No. 12,094,646.

(51) Int. Cl.

| | |
|---|---|
| *H01F 41/00* | (2006.01) |
| *B22F 1/054* | (2022.01) |
| *B22F 1/14* | (2022.01) |
| *B82Y 10/00* | (2011.01) |
| *B82Y 25/00* | (2011.01) |

(Continued)

(52) U.S. Cl.
CPC ............ *H01F 41/00* (2013.01); *B22F 1/0547* (2022.01); *B22F 1/056* (2022.01); *B22F 1/14* (2022.01); *B82Y 10/00* (2013.01); *B82Y 25/00* (2013.01); *B82Y 40/00* (2013.01); *C22C 19/03* (2013.01); *H01F 1/14708* (2013.01); *B22F 2202/05* (2013.01); *B22F 2301/15* (2013.01);
(Continued)

(58) Field of Classification Search
CPC ..................................................... G11C 19/08
See application file for complete search history.

(56) References Cited

U.S. PATENT DOCUMENTS

| | | | |
|---|---|---|---|
| 7,710,770 B2 | 5/2010 | Cowburn et al. | |
| 2010/0142265 A1 | 6/2010 | Atkinson et al. | |

FOREIGN PATENT DOCUMENTS

| | | | | |
|---|---|---|---|---|
| CN | 111115562 A | * | 5/2020 | ......... B81C 1/00047 |
| GB | 2447360 A | * | 9/2008 | ............. G11C 11/14 |

(Continued)

OTHER PUBLICATIONS

Glickman M., et al.; "High Permeability Permalloy for MEMS", "Solid-State Sensors, Actuators, and Microsystems Workshop", 2010 (Year: 2010).*

(Continued)

*Primary Examiner* — Sally A Merkling
*Assistant Examiner* — Austin Pollock
(74) *Attorney, Agent, or Firm* — Nath, Goldberg & Meyer; Joshua B. Goldberg

(57) ABSTRACT

The method for tuning the magnetic behavior of soft magnetic nanowires includes forming a pair of defects at axially-opposed ends of the nanowire. The defects change the switching field of the nanowire. As demonstrated by Object-Oriented MicroMagnetic Framework (OOMMF) simulation, the switching field value of the nanowire modified by a pair of defects at the two axially-opposed ends of the nanowire is more than the switching field value of a defect-free nanowire. The defect at each end may be a notch or an anti-notch.

20 Claims, 13 Drawing Sheets

(51) Int. Cl.
*B82Y 40/00* (2011.01)
*C22C 19/03* (2006.01)
*H01F 1/147* (2006.01)

(52) U.S. Cl.
CPC ....... *B22F 2998/10* (2013.01); *B22F 2999/00* (2013.01); *C22C 2202/02* (2013.01)

(56) References Cited

FOREIGN PATENT DOCUMENTS

| WO | 2007132174 A1 | 11/2007 |
| WO | 1440492015 | 10/2015 |

OTHER PUBLICATIONS

Sun L., et al.; "Tuning the properties of magnetic nanowires";; IBM J. Res. & Dev. Vol. 49, No. 1, 2005 (Year: 2005).*

Alam J.; "Cylindrical micro and nanowires: Fabrication, properties and applications", J. of Magnetism and Magnetic Materials; vol. 513, 2020 (Year: 2020).*

Atkinson et al., "Controlling domain wall pinning in planar nanowires by selecting domain wall type and its application in a memory concept," Applied Physics Letters, 92.2 (2008): 022510.

Bogart et al., "The effect of geometrical confinement and chirality on domain wall pinning behavior in planar nanowires," Journal of Applied Physics, 104.3 (2008): 033904.

Eastwood et al., "Scaling Behaviour of Chirality Dependent Domain Wall Pinning in Planar Nanowires," Memory, 3 (2010): 11.

Brandão et al., "Control of the magnetic vortex chirality in Permalloy nanowires with asymmetric notches," Journal of Applied Physics, 116.19 (2014): 193902.

Yuan et al., "Domain wall pinning in notched nanowires," Physical Review B, 89.5 (2014): 054423.

Liu et al., "Notched K-wire for low thermal damage bone drilling," Medical Engineering & Physics, 45 (2017): 25-33.

* cited by examiner

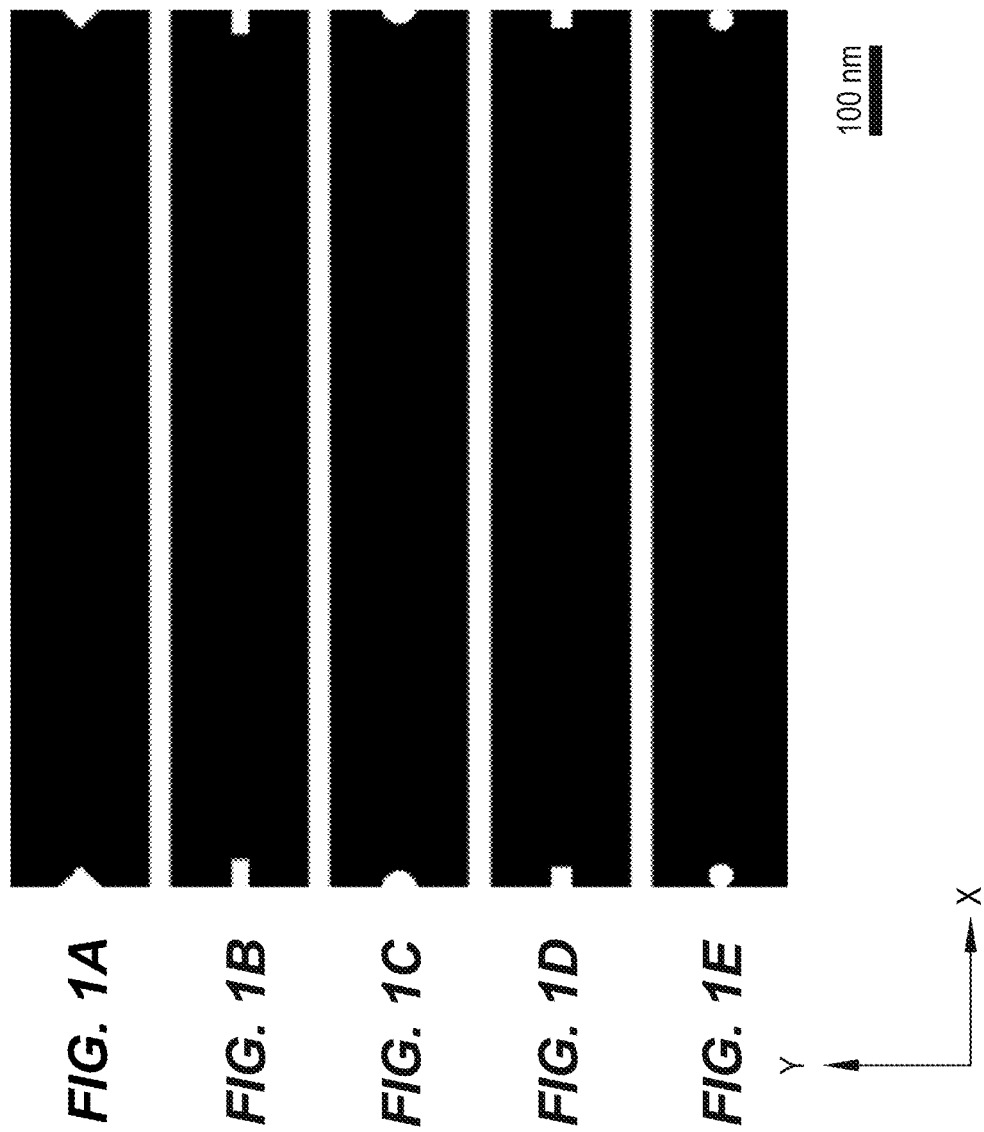

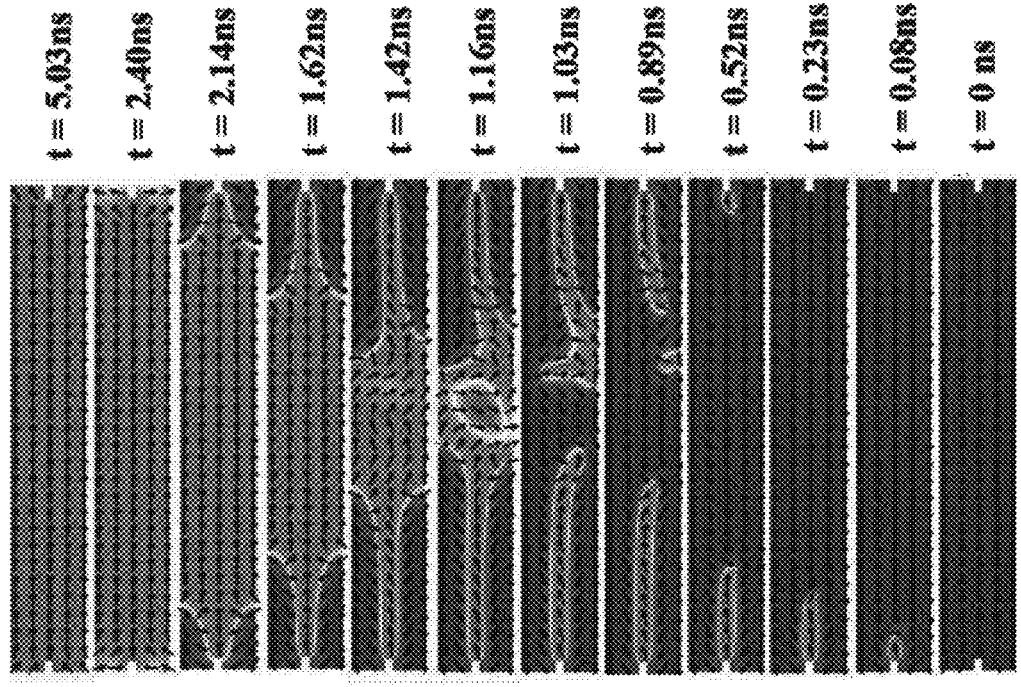
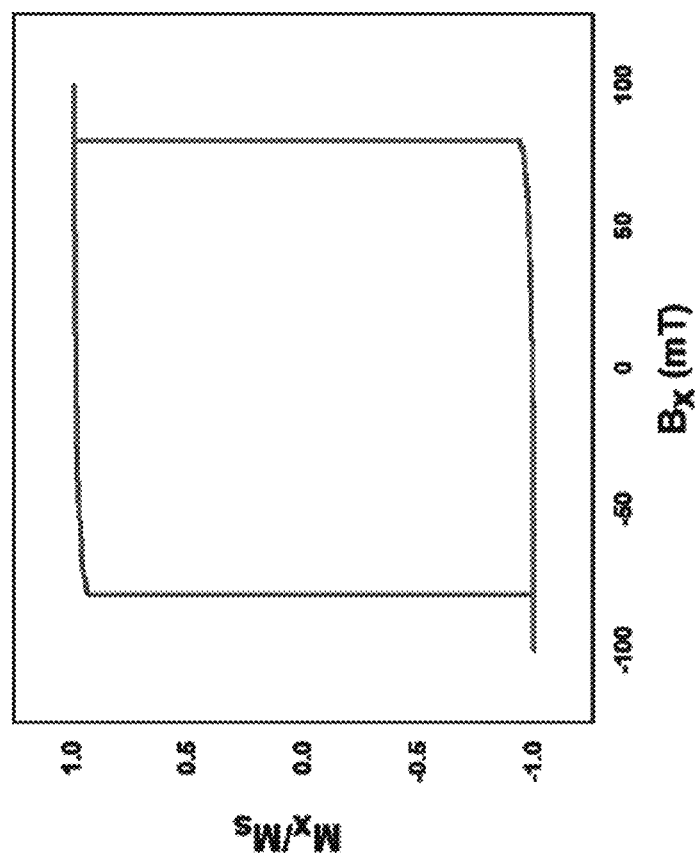
FIG. 3B

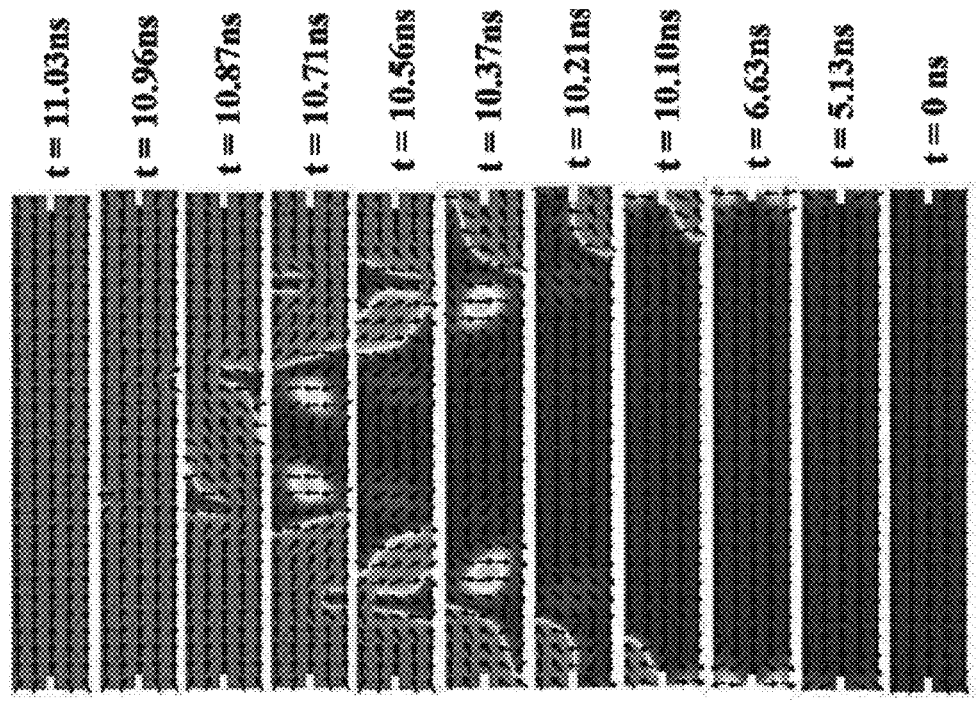
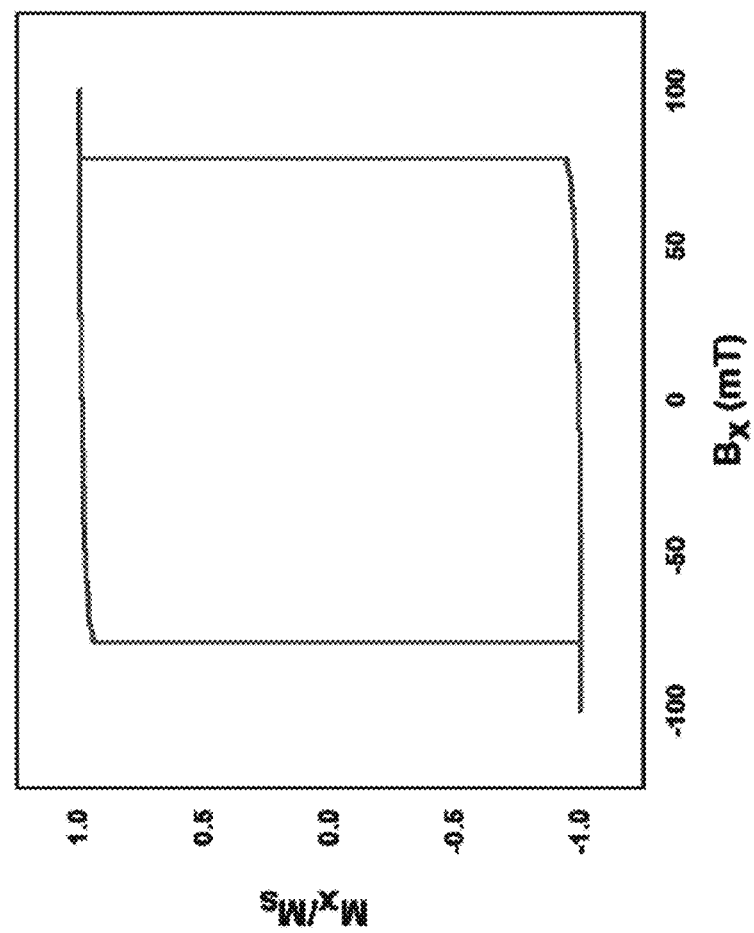
FIG. 3C

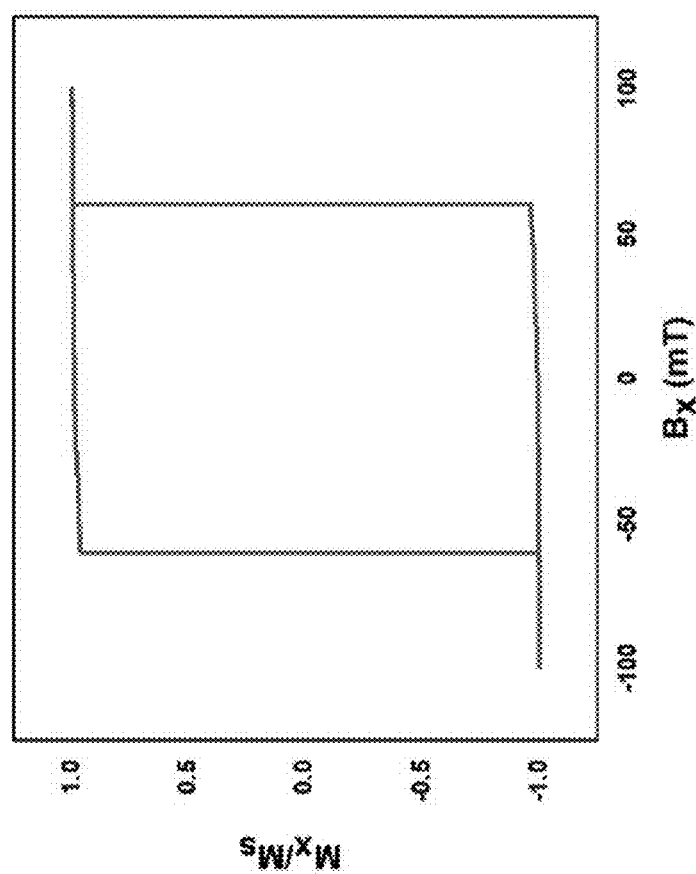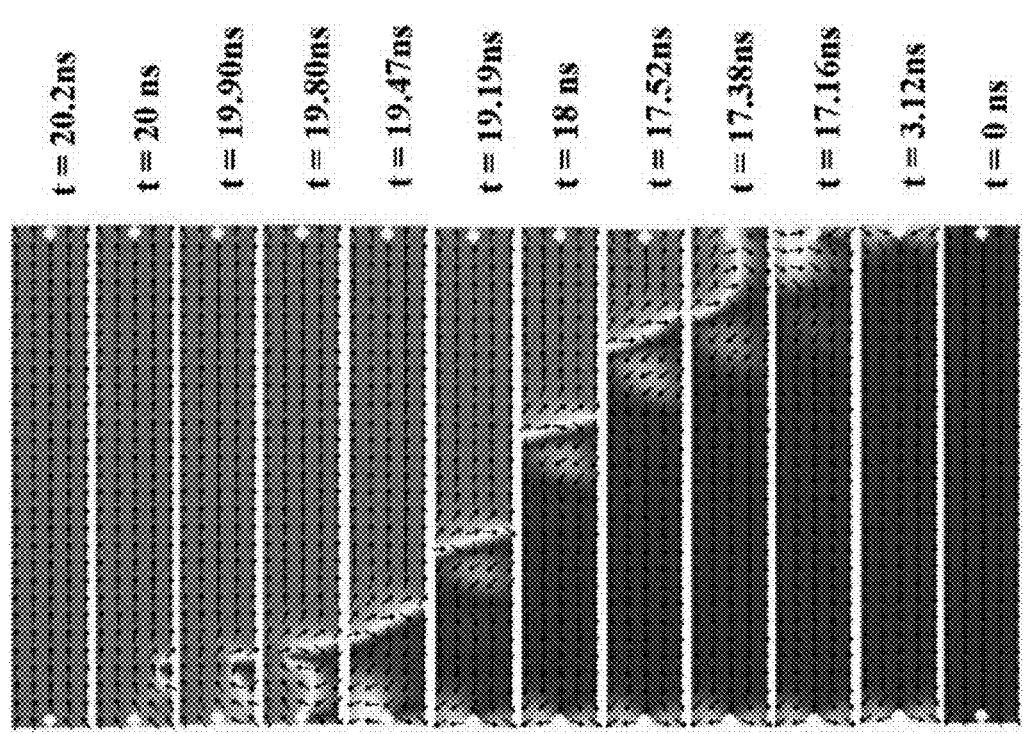
FIG. 3D

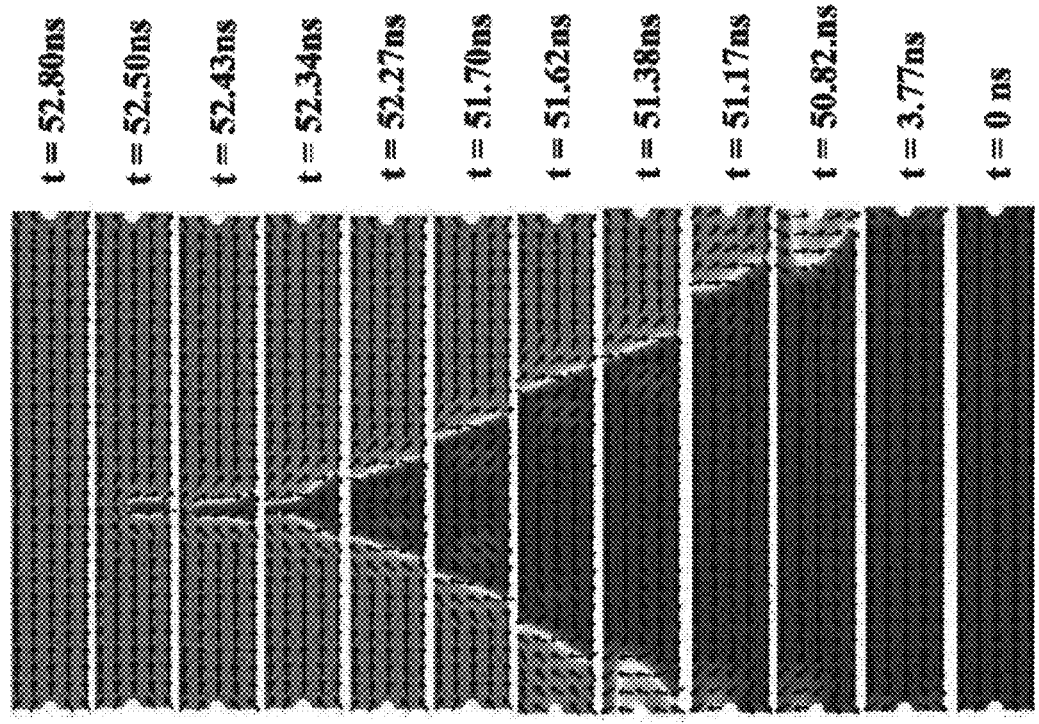
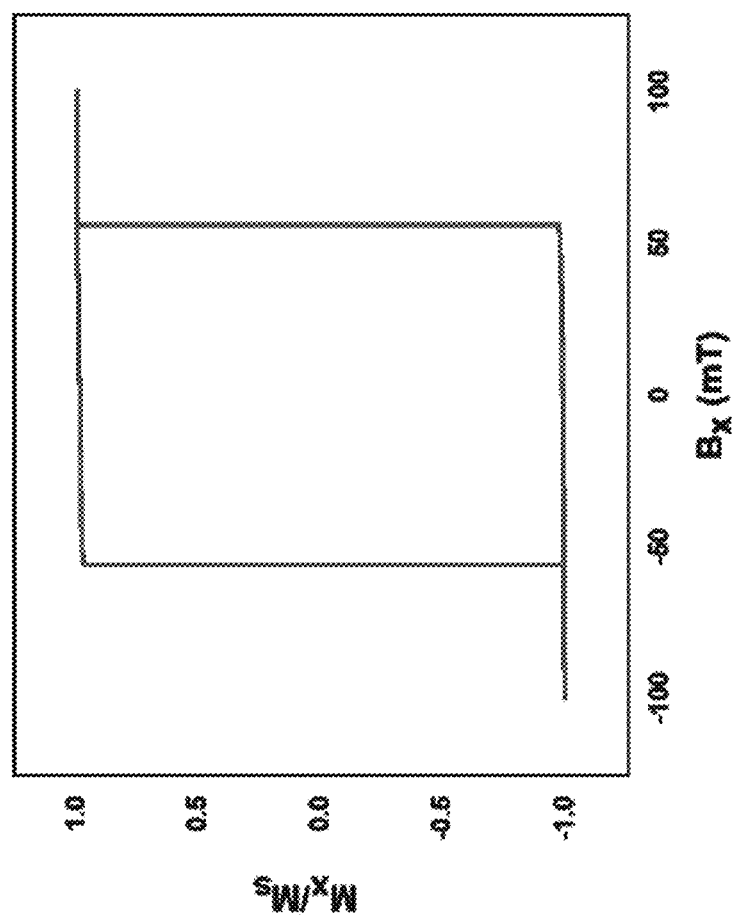
FIG. 3E

TUNING THE MAGNETIC BEHAVIOR OF SOFT MAGNETIC NANOWIRES

CROSS-REFERENCE TO RELATED APPLICATION

This application is a divisional of U.S. patent application Ser. No. 18/134,170, filed on Apr. 13, 2023, the entire contents of which are incorporated herein by reference.

BACKGROUND

1. Field

The disclosure of the present patent application relates to magnetic nanowires, and particularly to a method for tuning the magnetic behavior of soft magnetic nanowires.

2. Description of the Related Art

One of the most recent and important methods for altering the magnetic properties of nanowires (NWs) is inserting notches into the long side edges of the nanowire. Magnetization reversal of a wire under a magnetic field usually occurs by nucleation and propagation of a single domain wall. Domain walls (DWs) tend to nucleate and propagate from either end of the nanowires. For a wire with ideal symmetry, however, there is a chance of obtaining nucleation at both ends. Furthermore, changing the edge shape of one nanowire end from flat to tapered forces the walls to nucleate only at that end. Accordingly, the domain nucleation field increases for the tapered ended wire, leading to a higher switching field than that of a typical nanowire with a flat end. The magnetization switching in such structures is governed by the nucleation and propagation processes of DWs.

Magnetic nanowires have assumed importance in recent years as a possible alternative to conventional digital memories, as well as logic gates and electronic sensors. Sometimes called spintronics, the new technology exploits the magnetic spin of electrons. Domain walls may be positioned in the nanowires to separate regions wherein all particles on one side of the wall have a positive spin or magnetic moment, and all particles on the opposite side of the domain wall have a negative or opposite spin, corresponding to a binary "1" and a binary "0", respectively. Domain walls may be moved by application of magnet fields in the direction of a magnetic field extending axially through the wire to bring the regions sequentially past a magnetic reader, or all regions may be read simultaneously, depending on the length of the nanowire. Multiple bits may be stored on a single nanowire, allowing denser storage, they may be accessed quicker, and there is no need for a spinning mechanical device to read the media. Domain walls may be pinned at desired locations in the nanowires by structural features, such as notches. Although the effect of notches of various shapes in the side edges of nanowires on the propagation of domain walls through nanowires has been studied, it is believed that the effect of notches of various sizes and shapes in the axial ends of nanowires has not been studied.

Thus, a method for tuning the magnetic behavior of soft magnetic nanowires solving the aforementioned problems is desired.

SUMMARY

The method for tuning the magnetic behavior of soft magnetic nanowires includes forming a pair of defects at axially-opposed ends of the nanowire. The defects can change the switching field of the nanowire. As demonstrated by an Object-Oriented MicroMagnetic Framework (OOMMF) simulation, the switching field value of the nanowire modified by a pair of defects at the two axially-opposed ends of the nanowire is more than the switching field value of a defect-free nanowire. The defect at each end can include a notch or anti-notch. The nanowire is a Nickel-Iron ($Ni_{80}Fe_{20}$), also known as a Permalloy® (Py) nanowire.

These and other features of the present subject matter will become readily apparent upon further review of the following specification.

BRIEF DESCRIPTION OF THE DRAWINGS

FIGS. 1A, 1B, 1C, 1D, and 1E are schematic diagrams of the $Ni_{80}Fe_{20}$ nanowire masks that were used in the micromagnetic simulations, where the notches formed at the axially opposed ends are triangular, rectangular, semi-circular, square, and polygonal (eight-sided), respectively.

FIGS. 3A, 3B, 3C, 3D, and 3E depict a hysteresis loop (left) ($M_x/M_s$ as a function of magnetic flux $B_x$) and the corresponding schematic diagrams of propagation of domain waves at selected time intervals (right) under the influence of an applied magnetic field in computer simulations of the nanowires of FIGS. 1A-1E for the nanowires with axially opposed notches that are triangular, rectangular, square, polygonal (eight-sided) and semi-circular, respectively.

Similar reference characters denote corresponding features consistently throughout the attached drawings.

DETAILED DESCRIPTION OF THE PREFERRED EMBODIMENTS

Figure 2A:
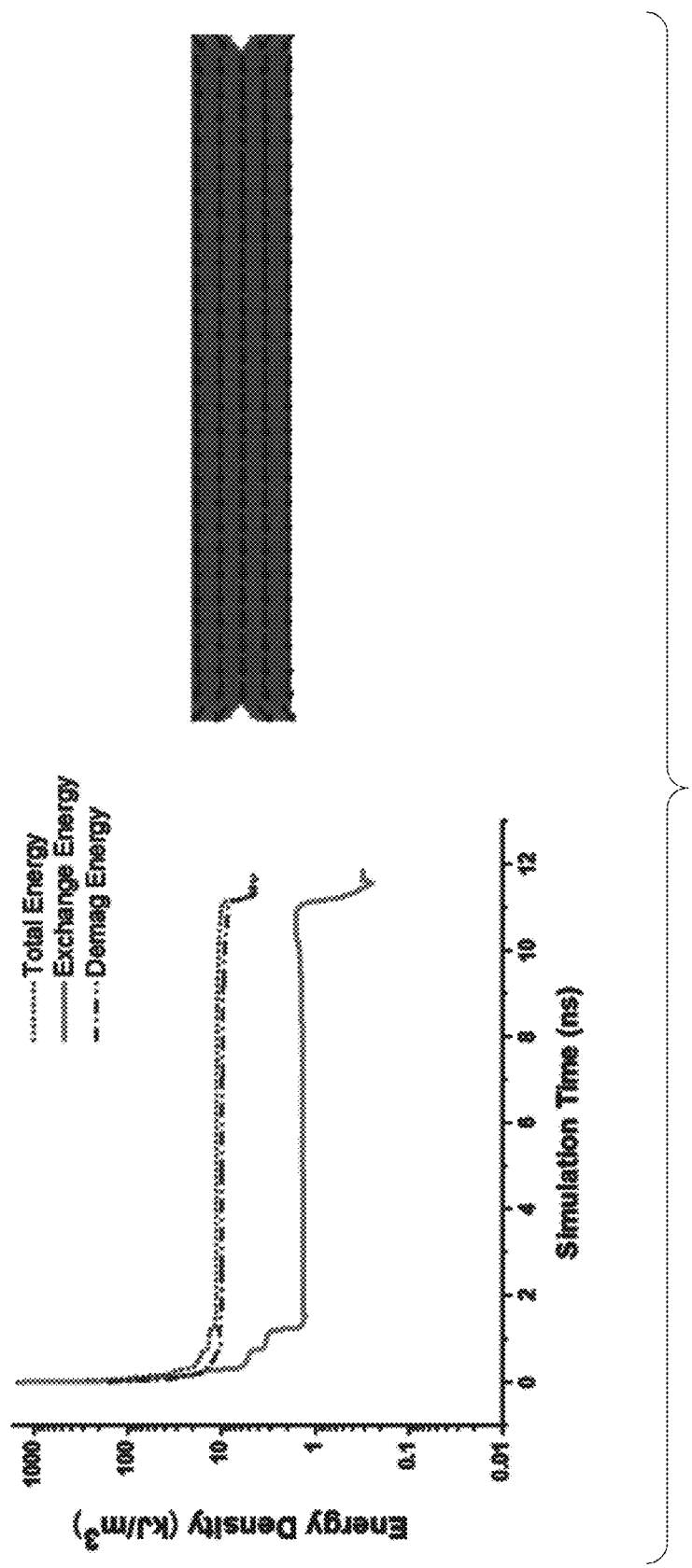
FIGS. 2A, 2B, 2C, 2D, and 2E are plots of total energy, exchange energy, and magnetostatic energy (expressed in density as $kJ/m^3$) as a function of time (ns) in computer simulations of the nanowires of FIGS. 1A-1E for the nanowires with axially opposed notches that are triangular, rectangular, square, polygonal (eight-sided) and semi-circular, respectively, in the absence of an applied magnetic field.
Figure 2B:
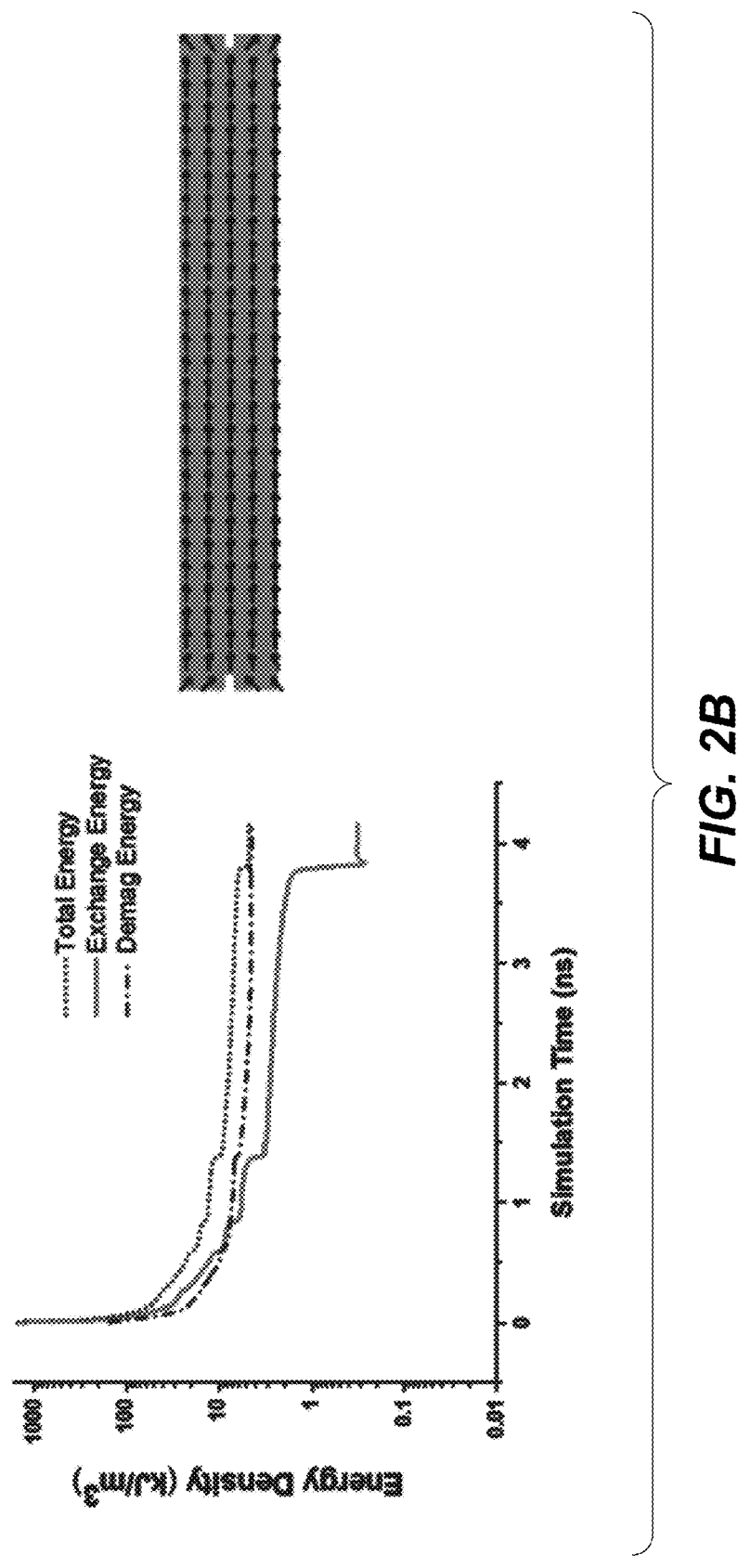
Figure 2C:
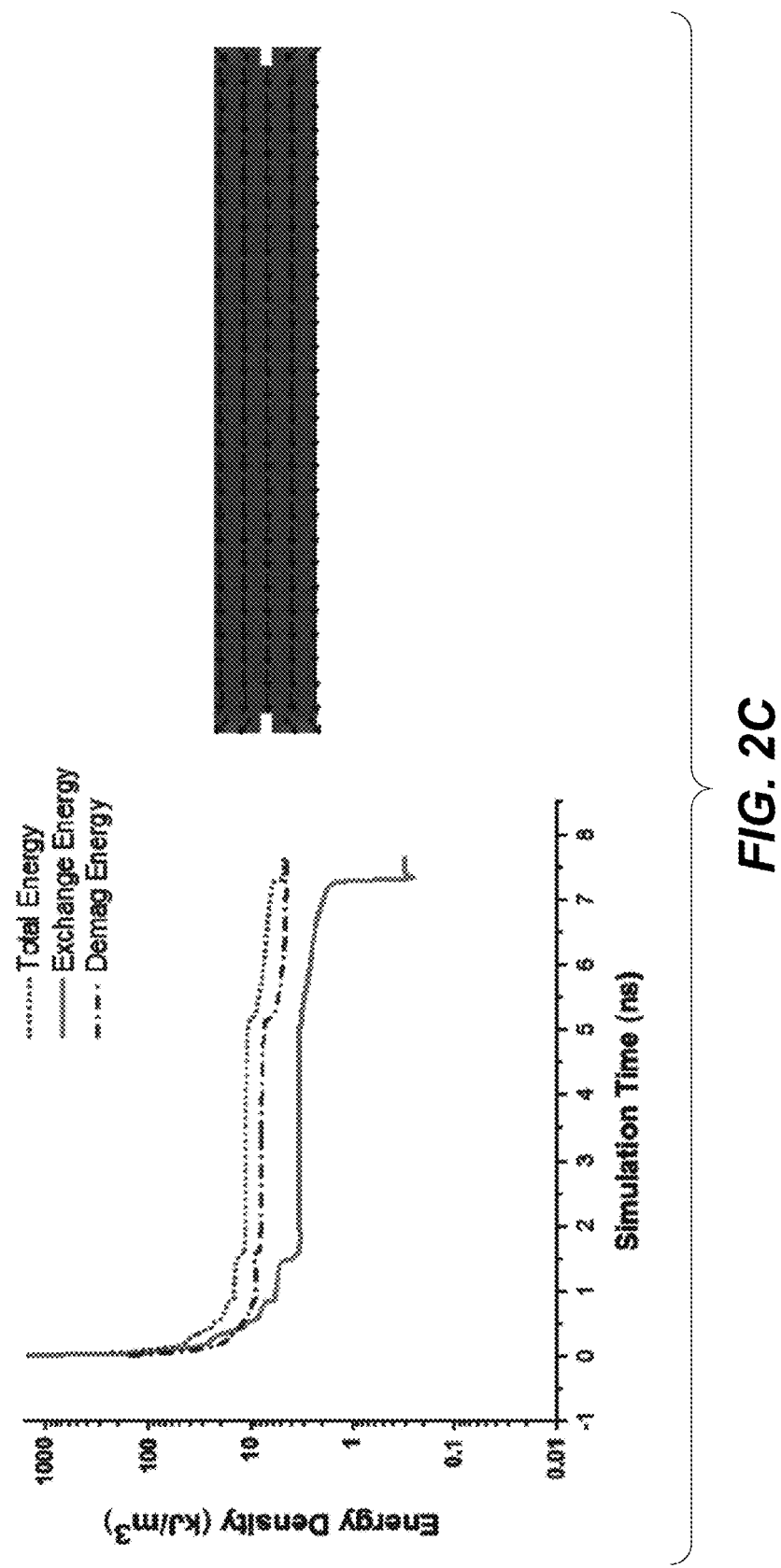
Figure 2D:
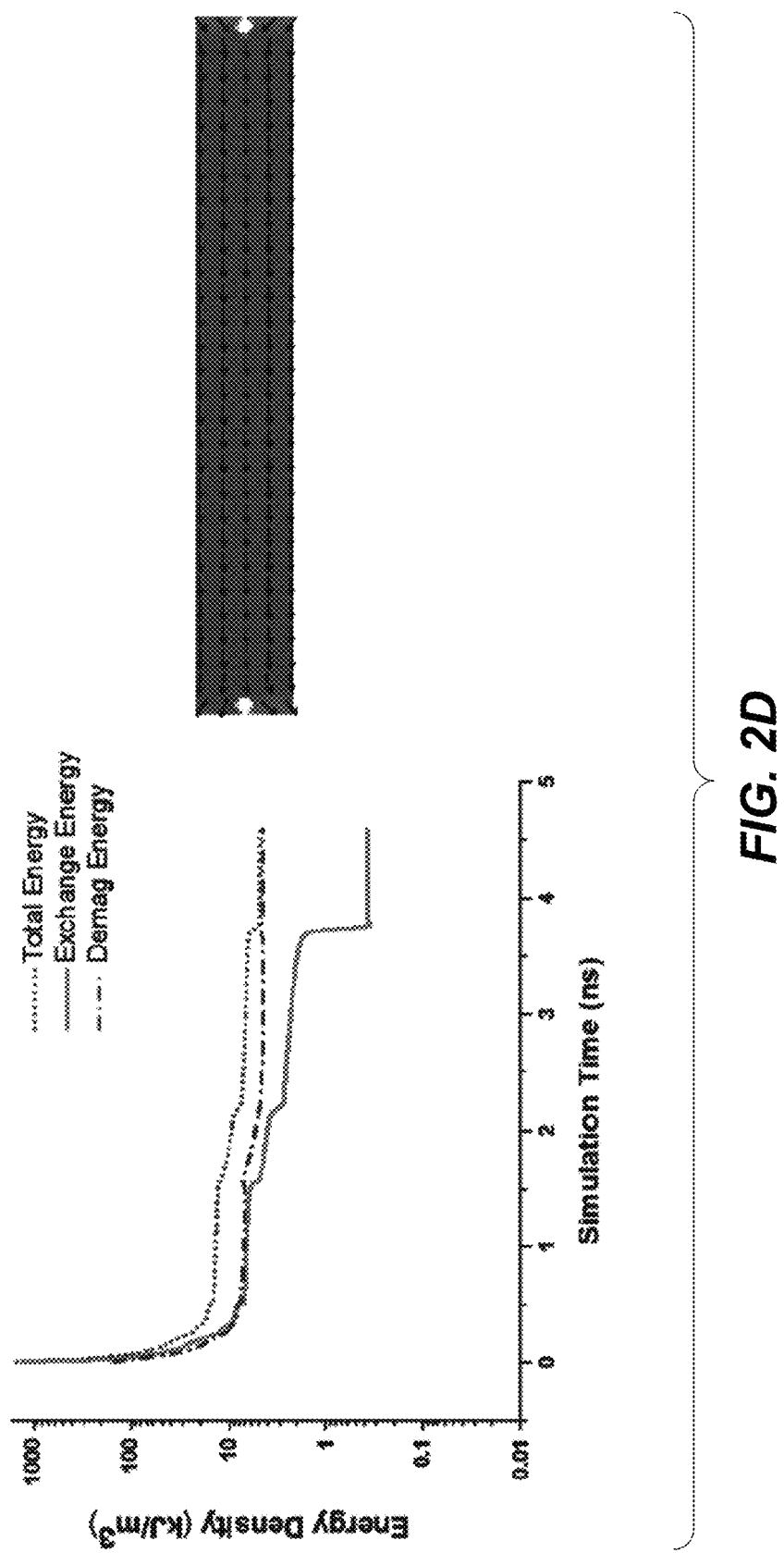
Figure 2E:
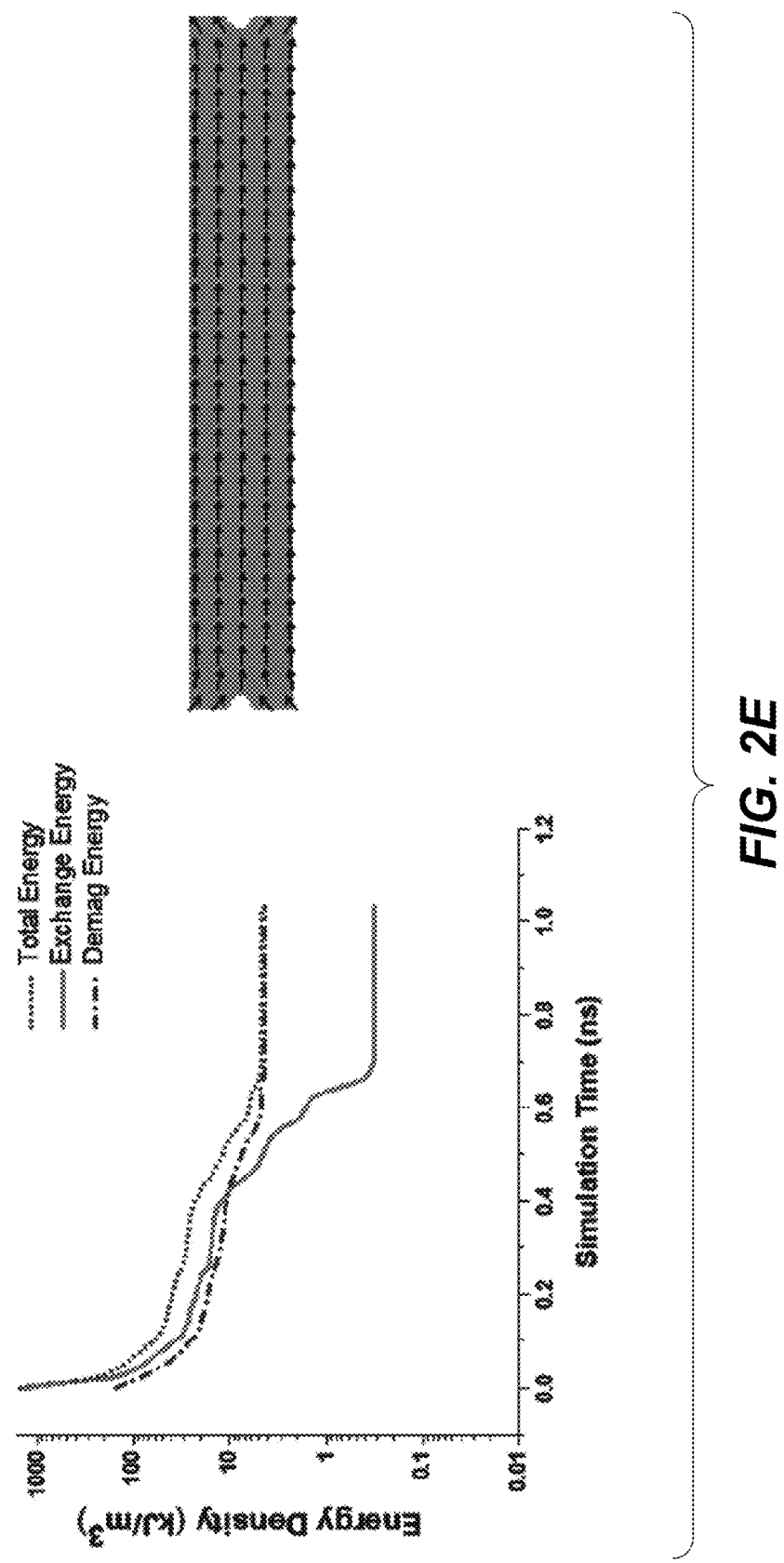

The method for tuning the magnetic behavior of soft magnetic nanowires includes defining a notch or an anti-notch in each of the axially opposed ends of the nanowire. The defect can include at least one of a notch and an anti-notch. The term "notch," as used herein, refers to a cut or indentation formed within the axial edge of the nanowire. The term "anti-notch," as used herein, refers to a protrusion extending from the axial edge of the nanowire.

The method may include placing a first notch at a first end of the nanowire and a second notch at a second, axially opposed end of the nanowire. Alternatively, the method may include placing a first anti-notch at a first end of the nanowire and a second anti-notch at a second, axially opposed end of the nanowire. Likewise, the method may include placing a notch in a first end of the nanowire and an anti-notch at a second, axially opposed end of the nanowire. The method may include changing the switching field of any of the above nanowires from a first magnitude to a second, increased magnitude. As used herein, the term "switching field" means a magnetic field of sufficient strength to reverse the magnetic state of a domain to the opposite state. It is sometimes referred to in the art as a "domain nucleation field. The nanowire may be, for example, a Nickel-Iron ($Ni_{80}Fe_{20}$) or Permalloy® (Py) nanowire, or any other soft magnetic nanowire.

The length of the nanowire should be much larger than the width of the nanowire. Thus, an aspect ratio (wire length/wire width) of the nanowire may be about 10. The thickness of the nanowire may be less than about 100 nm. The domain walls of the nanowire can be in the surface. The domain walls of the nanowire may be Neel's walls. The Neel's walls are transverse walls having a width under about 200 nm and a thickness below about 10 nm. The Neel's walls may be vortex walls having a width that is more than about 200 nm and a thickness that is more than about 10 nm. The exchange length (Lex) or major characteristic length of the nanowire is at least about 4 nm. Accordingly, length dimensions of the nanowire used in the present method can be about 4 nm or greater than about 4 nm. Below this length, microsimulation will no longer apply and molecular dynamics would be needed for such highly reduced dimensionality of nanowires. The nanowire may have a length of about 1000 nm.

The shape of the ends of the soft magnetic nanowires has a strong influence on the magnetic behavior of the nanowire. For example, a nanowire with tapered ends (needle-like shape) has a higher switching field than nanowires with flat ends. This is related to the presence of edge domains in the nanowires with rectangular ends. The edge domains tend to be annihilated in the nanowires with tapered ends. Nanowires with curved ends give higher switching fields because of the absence of edge domains.

By introducing notches in the axially-opposed ends of the nanowires, the present method achieves a wider range of control than that achieved by simply tapering the nanowire ends. For example, the switching field of a nanowire that is 1000 nm long, 150 nm wide, and 10 nm thick can be increased from 39 mT to 81 mT in a systematic way by introducing the pair of notches at the axially opposed ends of the nanowire. As magnetic reversal can be controlled by the nucleation of domain walls in the nanowire, it is believed that the role of notches and anti-notches is to impede the nucleation of the domain walls so that the nucleation happens at higher values of the applied magnetic field.

The switching field of a single nanowire can be altered significantly by the defect, e.g., notch or anti-notch, at each of the two axially-opposed ends of the Py nanowire. In the present method, the notch formed at each end may be the same or may be different. The nucleation and the presence/absence of edge domains is dependent on the selected notch shape and size. The soft magnetic nanowire can include notches and anti-notches of any suitable shape, including, rectangular, triangular, trapezoidal, spherical, and polygonal (e.g., eight-sided). The switching field can be almost doubled upon using a triangular notch at each end. The effect becomes lower if curved notches are used, such as semi-circular. The variation of the switching field with size can be more apparent for polygonal (eight-sided) and semi-circular notches in the Py nanowires and less apparent for square and rectangular notches in the Py nanowire. With triangular notches, however, the switching field has almost no dependence on the size of the notch area.

As demonstrated by an Object-Oriented MicroMagnetic Framework (OOMMF) simulation, the switching field for nanowires including the pair of identical notches at the two ends of the nanowire is different from the switching field of the notch-free nanowires.

The soft magnetic nanowires with axial notches can made experimentally by any suitable nanolithography technique, such as electron beam lithography or focused ion beam lithography. Electron beam lithography (EBL) with a very narrow electron beam can be a useful tool to define very fine features, e.g., about 10 nm in size. The nanopatterning procedure may include spin-coating the substrate (3000 rpm for 30 sec) with an electron sensitive organic resist, such as polymethyl methacrylate (PMMA), to provide a coated substrate and baking the coated substrate at 180° C. for 5 min prior to exposure. After that, the substrate is taken to the electron beam EBL machine (Raith 150), where the desired nanostructures are drawn by AutoCAD software and then transferred to the PMMA resist. Patterning the resist is performed by a focused electron beam produced at 10 keV. The exposed areas of the PMMA resist film undergo solubility changes compared with the unexposed area. This happens in a process called chain-scission and leads to polymer chain fragmentation upon exposure. Using a suitable developing solvent (in this case mixture of IPA and Methyl isobutyl ketone (MIBK) at 3:1 ratio) the exposed areas of the resist dissolve, leaving a pattern similar to the one that was initially designed by the software. The developing is undertaken at 23° C. for 30 seconds, followed by 30 seconds of rinsing in a pure IPA. After the metallization by thermal sputtering means, the lift-off is carried out by rinsing the metallized sample in warm acetone (50° C.) for 15 min. This is then followed by a gentle ultrasonic bath for about 2-3 minutes. This causes the resist to dissolve into the solvent, leading to a fragmentation of the deposited metallic film, except where it touches the substrate. Consequently, a defined pattern of the deposited metals is obtained as written by the EBL.

The method for tuning the magnetic behavior of soft magnetic nanowires will be better understood with reference to the following examples.

EXAMPLE 1

Effect of Notch Shape

Five different geometries (including semi-circular, polygonal, square, rectangular, and triangular) of notches were chosen in order to investigate the effect of shape on the magnetic behavior of the Py nanowire. FIGS. 1A-1E are schematic diagrams of nanowire masks with different notch patterns for $Ni_{80}Fe_{20}$ nanowires of length 1000 nm and width 150 nm. The area defined by the notches was kept the same at 625 $nm^2$ for each notch pattern. Computer-aided design (AutoCAD) software version 12 was used in this work to design the nanowire geometries. All of the micromagnetic simulations were performed using an open source simulation package, Object Oriented Micromagnetic Framework (OOMMF) software. The OOMMF package is based on the Landau-Lifshitz-Gilbert equation:

$$\frac{dM}{dt} = -\gamma M \times H_{eff} + \frac{\alpha}{M_s} M \times \frac{dM}{dt}, \qquad (1)$$

where $H_{eff}$ is the effective magnetic field (A/m), which is defined by:

$$H_{eff} = -\frac{\partial E}{\partial M}. \quad (2)$$

∂E is the energy density and consists of the following terms:

$$E = E_{ex} + E_{an} + E_{dem} + E_{ze}. \quad (3)$$

The LLG equation is a nonlinear differential equation and cannot be solved analytically for most geometries. Different types of solving methods are provided by OMMFF, including the mmSolve2D solver. The calculated parameters for $Ni_{80}Fe_{20}$ are as follows: $M_s=860\times10^5$ A/m, $A=1.3\times10^{11}$ J/m, K=0 J/m, a=0.5 and T=0K. The demagnetization is set to be constant, and the anisotropy is chosen to be uniaxial. The total width, depth and thickness of the sample is also specified. The nanowire structure can be added by using a two-dimensional mask.

The simulation is then run and while it is running, the magnetization state evolves until the structure reaches an equilibrium state, where $$\frac{dM}{dt} < 0.1 deg/\text{ns}.$$

The magnetic configurations and energy densities at zero applied field for $Ni_{80}Fe_{20}$ nanowire (l=1000 nm w=150 nm and t=10 nm) with notches of different shapes are shown in FIGS. 2A-2E. The right-hand side of FIGS. 2A-2E shows the magnetic configuration of the $Ni_{80}Fe_{20}$ nanowire, which all have a single domain structure. On the left-hand side, the energy densities for exchange, magnetostatic, and total energies are plotted versus simulation time. The energy density of all $Ni_{80}Fe_{20}$ nanowires reaches a minimum when stabilization starts occurring. This proves that these structures are magnetically stable in the absence of an applied magnetic field.

The magnetic structure of the notched nanowires is mainly a single domain structure for all notch shapes as a result of the dominance of shape anisotropy in the nanoscale. Table 1 shows a summary of the minimum values of exchange, magnetostatic, and total energy of Py NWs with different notch shapes. The nanowire with polygonal (eight-sided) notches has the highest total energy in comparison with other notch shapes. The Py NW with triangular notches has the lowest total energy, which means more stability than other configurations.

TABLE 1

Summary of minimum energies for different notch shapes

| Shape of notches | Exchange Energy (J/m³) | Demag Energy (J/m³) | Total Energy (J/m³) |
| --- | --- | --- | --- |
| Triangle | 311.1 | 4193.6 | 4504.7 |
| Square | 327.95 | 4464.6 | 4792.5 |
| Rectangle | 311.98 | 4476.33 | 4788.3 |
| Polygon | 384.6 | 4586.3 | 4970.9 |
| Semicircle | 322.1 | 4312.4 | 4634.5 |

The dynamic behavior of the notched $Ni_{80}Fe_{20}$ nanowires is shown in FIGS. 3A-3E. A magnetic field of 100 mT was applied gradually along the x-axis (the long axis of the nanowire). In this case, the chosen notch shapes were again kept at a fixed area of 625 nm². The effect of the notch shape can be seen from the hysteresis loops ($M_x/M_s$ vs $B_x$) that are displayed on the left-hand side of FIGS. 3A-3E.

Figure 3A:
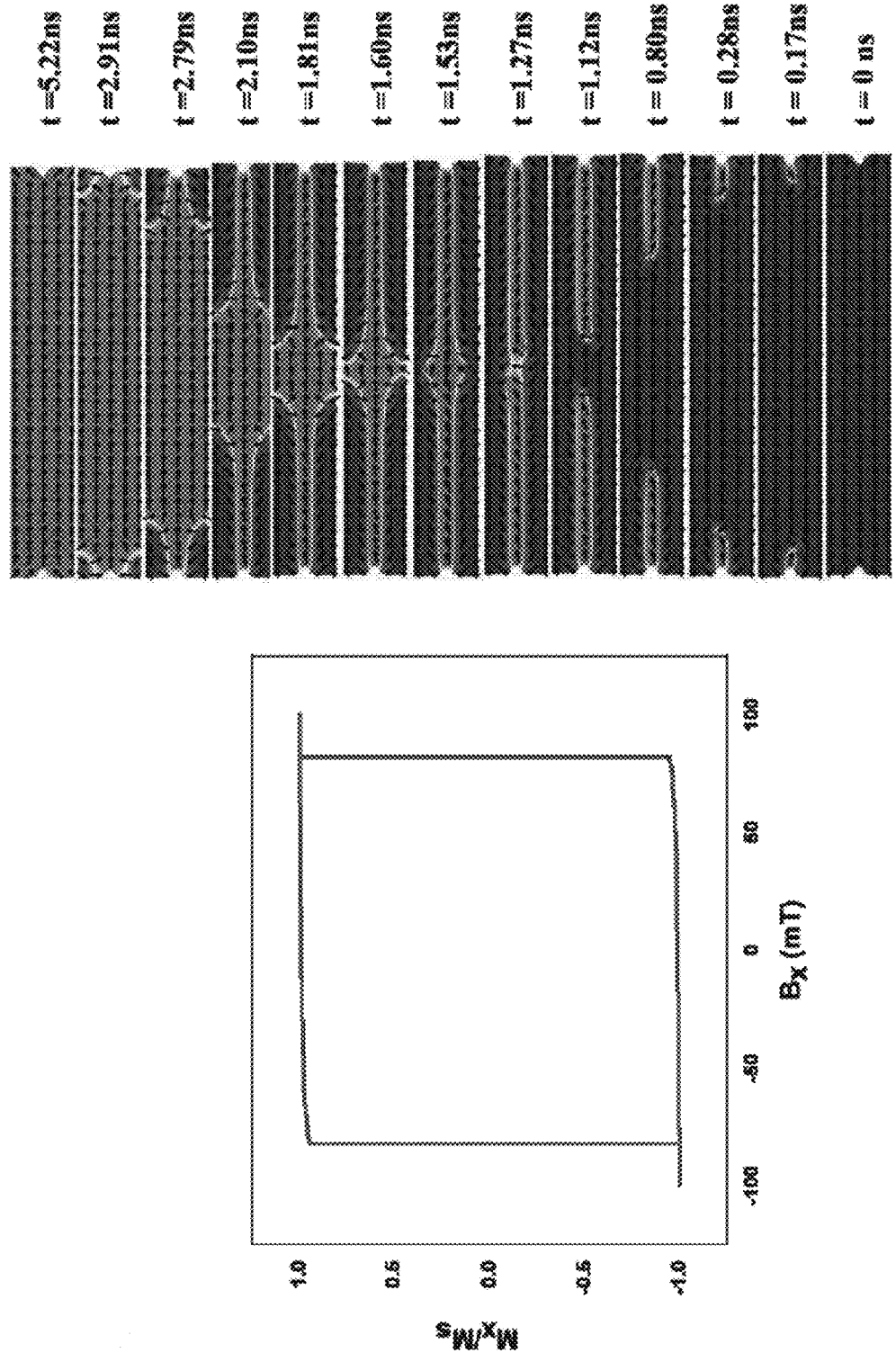

The corresponding right-hand side of FIGS. 3A-3E shows a schematic diagram of movement of domain walls at discrete time intervals under the influence of a magnetic field applied to the end(s) of the corresponding $Ni_{80}Fe_{20}$ nanowire having a pair of notches of selected shapes at both ends. As can be seen from FIGS. 3A, 3B, 3C, and 3E, domain walls start nucleation at the vicinity of each notch at both ends of the Py NW and then move towards each other along the NW axially to form a bigger domain wall, which expands on both sides and causes a magnetic reversal. In FIG. 3D, the domain wall was generated from one end near the notch and propagated towards the other end, causing a magnetization reversal. It can be seen that most domain walls presented here are transverse to the applied magnetic field.

Figure 4:
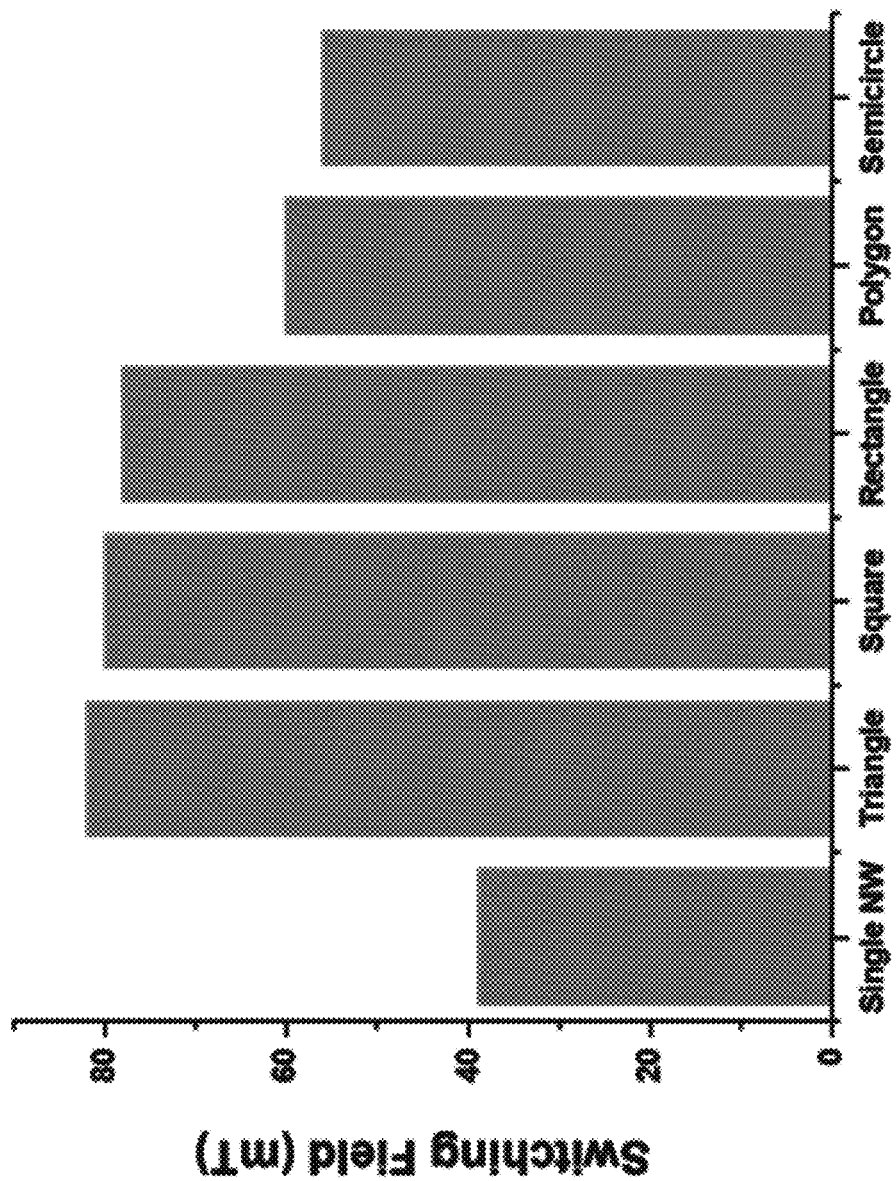
FIG. 4 depicts a bar chart of the switching field in computer simulations of the nanowires of FIGS. 1A-1E for the nanowires with axially opposed notches that are triangular, rectangular, square, polygonal (eight-sided) and semi-circular, respectively (the first bar represents a switching field of the single $Ni_{80}Fe_{20}$ nanowire without notches at the ends).

The results obtained from the simulation of NWs are presented in Table 2. There was a significant relationship between the notch shape and the switching field strength of Py NWs. The effect of the notch shape on the switching field of $Ni_{80}Fe_{20}$ nanowires is presented in a bar diagram in FIG. 4. Table 2 shows that $Ni_{80}Fe_{20}$ nanowire with triangular and square notches have higher values of switching field compared to the other notch shapes. The switching field reaches 82 mT and 80 mT for triangular and square notches, respectively, indicating about 110% and 103% increase in the switching field with reference to the nanowire without notches. The value of the switching field was almost doubled in the Py NW with a rectangular notch at both ends, reaching 78 mT as compared to the nanowire without notches. Nanowires having an eight-sided polygonal shape at the ends show an increase of almost 60% in the switching field, as compared to the NW without notches. The lowest increase in the switching field of about 44% is associated with the NW with semicircular notches at both ends of the Py nanowire, as the value of the switching field was just 56 mT.

TABLE 2

Switching field $H_s$ (mT)

| Shape of notches | Switching Field (mT) |
| --- | --- |
| Triangle | 82 |
| Square | 80 |
| Rectangle | 78 |
| Polygon | 60 |
| Semi-Circle | 56 |

EXAMPLE 2

Effect of Notch Area

Figure 5:
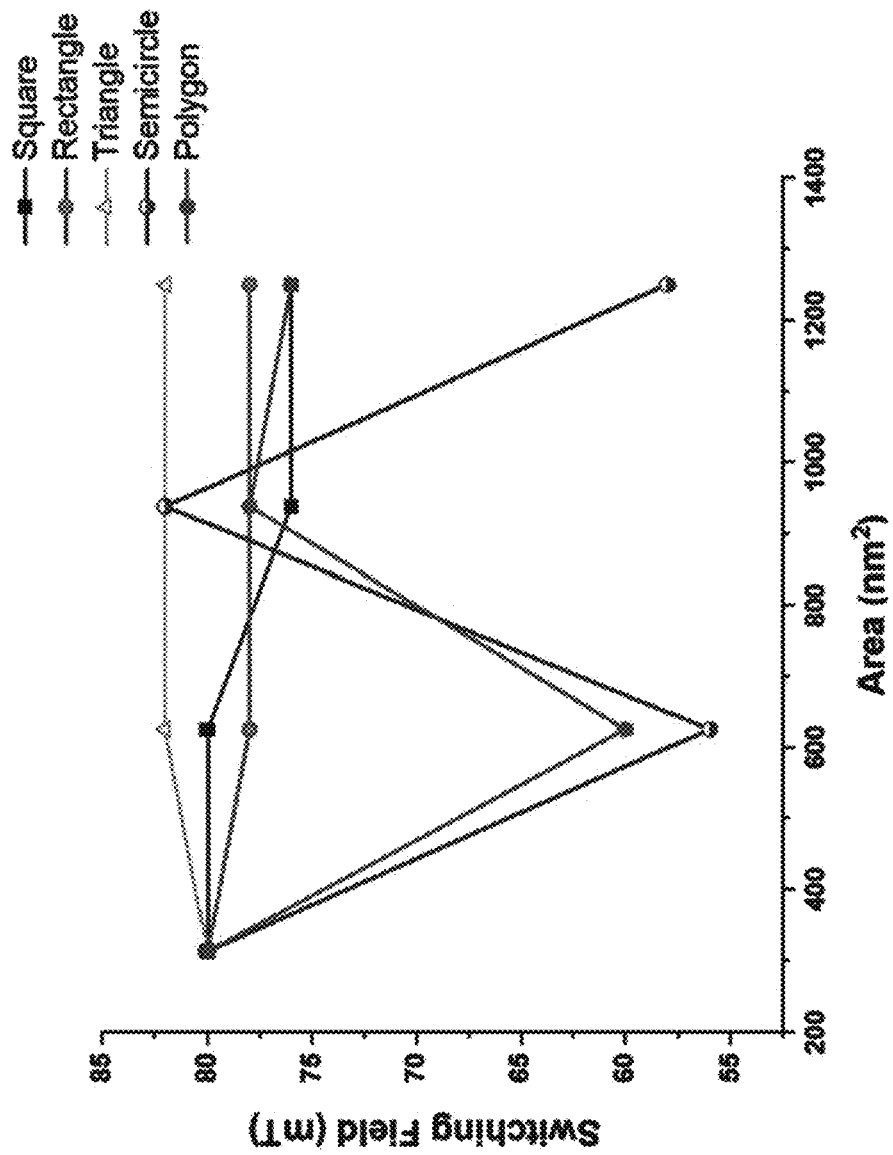
FIG. 5 is a plot of switching field in milliTeslas (mT) as a function of notch area in computer simulations of the nanowires of FIGS. 1A-1E for areas of 312.5, 625, 937.5 and 1250 $nm^2$, respectively.

The effect of the notch area on the switching fields of the $Ni_{80}Fe_{20}$ nanowires with selected notches (square, rectangle, triangle, semicircle and polygon) was investigated. As shown in FIG. 5, upon varying the notch area (312.5, 625, 937.5 and 1250 nm²), the switching field of the notched Py nanowires has a significant dependence on the area of the notch for semicircular and eight sided-polygon-shaped notches and less significant dependence for Py nanowires with square and rectangular notches. However, the switching field is constant for the Py nanowire with the triangular notch above 312.5 nm$^2$.

It is to be understood that the method described herein is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A soft magnetic nanowire, comprising an elongated soft magnetic nanowire having a length, a width, and first and second axially opposed ends and notches defined in the axially opposed ends wherein the notches have a shape selected from the group consisting of square, rectangular, polygonal, and triangular.

2. The soft magnetic nanowire according to claim 1, wherein the soft magnetic nanowire comprises a $Ni_{80}Fe_{20}$ alloy.

3. The soft magnetic nanowire according to claim 1, wherein the nanowire has an aspect ratio of 10.

4. The soft magnetic nanowire according to claim 1, wherein the nanowire has a thickness less than 100 nm.

5. The soft magnetic nanowire according to claim 1, wherein the length of the nanowire is at least 4 nm.

6. The soft magnetic nanowire according to claim 1, wherein the length of the nanowire is between 4 nm and 1000 nm.

7. The soft magnetic nanowire according to claim 1, wherein the width of the nanowire is 150 nm.

8. The soft magnetic nanowire according to claim 1, wherein the width of the nanowire is 150 nm and the length of the nanowire is 1000 nm.

9. The soft magnetic nanowire according to claim 1, wherein the notches are polygonal.

10. The soft magnetic nanowire according to claim 1, wherein the notches are square.

11. The soft magnetic nanowire according to claim 1, wherein the notches are rectangular.

12. The soft magnetic nanowire according to claim 1, wherein the notches are triangular.

13. A soft magnetic nanowire, comprising an elongated soft magnetic nanowire having a length, a width, and first and second axially opposed ends and notches defined in the axially opposed ends, wherein the nanowire has a single domain.

14. The soft magnetic nanowire according to claim 13, wherein the soft magnetic nanowire comprises a $Ni_{80}Fe_{20}$ alloy.

15. The soft magnetic nanowire according to claim 13, wherein the nanowire has an aspect ratio of 10.

16. The soft magnetic nanowire according to claim 13, wherein the nanowire has a thickness less than 100 nm.

17. The soft magnetic nanowire according to claim 13, wherein the length of the nanowire is at least 4 nm.

18. The soft magnetic nanowire according to claim 13, wherein the length of the nanowire is between 4 nm and 1000 nm.

19. The soft magnetic nanowire according to claim 13, wherein the width of the nanowire is 150 nm.

20. The soft magnetic nanowire according to claim 13, wherein the width of the nanowire is 150 nm and the length of the nanowire is 1000 nm.

* * * * *